United States Patent
Bugnion

(10) Patent No.: US 9,201,653 B2
(45) Date of Patent: *Dec. 1, 2015

(54) BINARY TRANSLATOR WITH PRECISE EXCEPTION SYNCHRONIZATION MECHANISM

(71) Applicant: VMware, Inc., Palo Alto, CA (US)

(72) Inventor: Edouard Bugnion, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,651

(22) Filed: Oct. 22, 2012

(65) Prior Publication Data

US 2013/0151824 A1    Jun. 13, 2013

Related U.S. Application Data

(63) Continuation of application No. 12/398,655, filed on Mar. 5, 2009, now Pat. No. 8,296,551, which is a continuation of application No. 09/592,368, filed on Jun. 12, 2000, now Pat. No. 7,516,453, which is a continuation-in-part of application No. 09/179,137, filed on Oct. 26, 1998, now Pat. No. 6,397,242.

(51) Int. Cl.
  *G06F 9/38*      (2006.01)
  *G06F 9/455*     (2006.01)

(52) U.S. Cl.
  CPC .............. *G06F 9/38* (2013.01); *G06F 9/45504* (2013.01); *G06F 9/45516* (2013.01); *G06F 9/45533* (2013.01)

(58) Field of Classification Search
  CPC ........................... G06F 9/30174; G06F 9/3865
  See application file for complete search history.

(56) References Cited

U.S. PATENT DOCUMENTS

| | | | |
|---|---|---|---|
| 4,703,481 A | 10/1987 | Fremont | |
| 5,369,757 A | 11/1994 | Spiro et al. | |
| 5,410,685 A | 4/1995 | Banda et al. | |
| 5,966,706 A | 10/1999 | Biliris et al. | |
| 6,308,318 B2 * | 10/2001 | Krishnaswamy | 717/139 |
| 6,421,739 B1 | 7/2002 | Holiday | |
| 6,442,605 B1 | 8/2002 | Rodriguez | |
| 6,549,959 B1 * | 4/2003 | Yates et al. | 710/22 |

(Continued)

OTHER PUBLICATIONS

Non-Final Rejection mailed on Nov. 17, 2009 for U.S. Appl. No. 10/921,417, filed Aug. 16, 2004.

(Continued)

*Primary Examiner* — Benjamin Geib

(57) ABSTRACT

A source computer system with one instruction set architecture (ISA) configured to run on a target hardware system that has its own ISA. During execution from binary translation, synchronous exceptions may be either transparent (requiring processing action wholly within the target computer system) or non-transparent (requiring processing that alters a visible state of the source system, and asynchronous exceptions may also be either transparent or non-transparent, in which case an action that alters a visible state of the computer system needs to be applied. The system also includes subsystems, and related methods of operation, for detecting the occurrence of all of these types of exceptions, to handle them, and to do so with precise reentry into the interrupted instruction stream. The binary translation and exception-handling subsystems are included as components of a virtual machine monitor which is installed between the target hardware system and the source system.

16 Claims, 5 Drawing Sheets

(56) References Cited

U.S. PATENT DOCUMENTS

| | | |
|---|---|---|
| 6,742,123 B1 | 5/2004 | Foote |
| 6,795,966 B1 | 9/2004 | Lim et al. |
| 7,103,625 B1 | 9/2006 | Hipp et al. |
| 7,203,944 B1 | 4/2007 | van Rietschote et al. |
| 7,213,246 B1 | 5/2007 | van Rietschote et al. |
| 7,246,200 B1 | 7/2007 | van Rietschote et al. |
| 7,313,793 B2 | 12/2007 | Traut et al. |
| 7,370,164 B1 | 5/2008 | Nagarkar et al. |
| 7,516,453 B1 * | 4/2009 | Bugnion .......................... 718/1 |
| 7,793,286 B2 | 9/2010 | Bennett et al. |
| 8,032,351 B2 | 10/2011 | Stringham |
| 8,032,868 B2 | 10/2011 | Bates et al. |
| 8,065,676 B1 | 11/2011 | Sahai et al. |
| 8,296,551 B2 * | 10/2012 | Bugnion ........................ 712/244 |
| 2009/0282101 A1 | 11/2009 | Lim et al. |

OTHER PUBLICATIONS

Optimizing the Migration of Virtual Computers, Constantine P. Sapuntzakis, 2002.

Optimizing the Migration of Virtual Computers, 2002.

Silva et al., "Portable Checkpointing and Recovery," 1995, IEEE, pp. 188-195.

* cited by examiner

BINARY TRANSLATOR WITH PRECISE EXCEPTION SYNCHRONIZATION MECHANISM

CROSS-REFERENCE TO RELATED APPLICATIONS

This application is a Continuation of pending U.S. patent application Ser. No. 12/398,655, "Binary Translator with Precise Exception Synchronization Mechanism," filed Mar. 5, 2009, which is a Continuation of U.S. patent application Ser. No. 09/592,368, "Binary Translator with Precise Exception Synchronization Mechanism," filed Jun. 12, 2000, now issued as U.S. Pat. No. 7,516,453, which is a Continuation-in-Part of U.S. patent application Ser. No. 09/179,137, "Virtualization System Including a Virtual Machine Monitor for a Computer with a Segmented Architecture," filed Oct. 26, 1998, now issued as U.S. Pat. No. 6,397,242.

This application also incorporates by reference U.S. patent application Ser. No. 09/203,825, "Dynamic Binary Translator with a System and Method for Updating and Maintaining Coherency of a Translation Cache," now issued as U.S. Pat. No. 6,704,925, and U.S. patent application Ser. No. 09/179,137, "Virtualization System Including a Virtual Machine Monitor for a Computer with a Segmented Architecture," now issued as U.S. Pat. No. 6,397,242.

BACKGROUND OF THE INVENTION

1. Field of the Invention

This invention relates to computer systems that run at least one sub-system whose instruction set (the source instruction set) differs from the instruction set (the target instruction set) of the underlying hardware architecture or of another underlying sub-system, and that include a binary translator to convert instructions from the source set to the target set. It also relates to computer systems as described above in which the source and target instruction sets are similar, and the binary translator is used to simulate or augment the source instruction set on the target instruction set. In particular, the invention relates to a mechanism for synchronizing exceptions in a binary translator.

2. Description of the Related Art

Binary translation is a technique, implemented in software by a module known as a binary translator, that converts a source instruction sequence destined for a first instruction set architecture (ISA) into an equivalent instruction sequence that executes on a target instruction set architecture. If the source and target instruction set architecture differ, then the binary translator is called cross-architectural. Examples of cross-architectural binary translators include all Java "Just-In-Time" compilers such as the Sun HotSpot JVM, the IBM DAISY virtual machine monitor, the Transmeta Code-Morphing translator, the Connectix VirtualPC simulator, the FX!32 emulator, and the various HP-to-EPIC binary translators. The purpose of such cross-architectural binary translators is generally to allow the execution of applications and operating systems compiled for the given source ISA to execute without modification on the target ISA. In this context, the term "equivalence" means that the software executes as though it would on the source ISA.

Binary translators are also used when the source and target ISA are identical. In this case, binary translators have typically been used as part of tools to instrument the source instruction sequences. For example, they have been used in machine simulators such as SimOS, in software distributed shared memory systems such as Shasta, as a part of toolkits that allow the generic instrumentation of a binary, such as ATOM and Etch, and for optimization purposes such as in, for example, the Spike and Om systems.

Binary translators, whether cross-architectural or not, convert a source instruction sequence into a different target instruction sequence. Note that the conversion is not always one-to-one: Although certain single source instructions are translated into corresponding single target instruction, certain other source instructions are converted into a sequence of two or more target instructions. Conversely, certain source instructions may be eliminated and correspond to zero instructions.

Modern hardware processors have a precise exception model, which guarantees that all instructions are either executed by the processor atomically, or that they generate exceptions in such a manner that the software exception handler can finish its execution by resuming the execution of the instruction sequence at the point of the exception. In other words, if an exception forces a change in the flow of instruction execution, then, once the exception is processed, the software is able to return to the exception point, in effect, picking up where it left off.

In the case where the processor is executing code generated by a binary translator, that is, a target instruction sequence, the precise exception model of the processor applies to the target instruction sequence and not the source instruction sequence. For example, assume that a single source instruction S1 is converted by binary translation into the target instruction sequence T1, T2, T3. If an exception occurs immediately before the hardware processor executes T2, then precise exception handling dictates that the system must guarantee either that T2 and T3 complete so that S1 completes, or that any state changes made by T1 are undone so that S1 has not executed. In other words, although the exception can occur at any target instruction boundary, it is the responsibility of the binary translation system to ensure that they appear to the virtual machine as having occurred only on a source instruction boundary.

The problem statement can be further refined into two separate sub-problems, namely problems relating to the handling of synchronous and asynchronous exceptions. Synchronous exceptions are exceptions generated as a direct result of the attempt to execute the (target) instruction. Common examples of synchronous exceptions include page faults, general exception faults, division-by-zero errors, and illegal instruction faults.

Asynchronous exceptions (also called interrupts) are, in contrast, generated by the processor as the result of an external event. Examples of such asynchronous exceptions include device completion interrupts, timed interrupts, disk interrupts, and inter-processor interrupts requested by another processor. Asynchronous exceptions can thus also be considered to be a form of "external interrupts" since they are typically caused by some external device and are typically not "errors," inasmuch as they signal or correspond to some desired device action.

SUMMARY OF THE INVENTION

Given a hardware target computer system, which has a target instruction set architecture (ISA), some embodiments of the invention provide a source system. The source system has a source ISA and runs on the target computer system, so that the target system executes target instruction sequences corresponding to the source instructions. The source ISA may be, but does not have to be, identical to the target ISA.

A binary translation subsystem converts the source instructions into the target instruction sequences by binary translation, with source instructions being converted into corresponding translated target instruction sequences, some of which may consist of a single target instruction.

Some embodiments of the invention include an exception-handling mechanism that senses the presence of an exception and delays application of the sensed exception until after completion of a source instruction corresponding to the translated target instruction sequence being executed at the time of the sensing of the presence of the exception.

Some embodiments of the invention involve determining and mapping beginning and ending addresses of each source instruction and each corresponding translated target instruction sequence.

The exception-handling mechanism in some embodiments of the invention is provided for distinguishing between and handling two main types of exceptions: synchronous and asynchronous. According to some embodiments of the invention, a synchronous exception is an exception resulting from attempted execution of a target instruction; an asynchronous exception is an exception resulting from an event unrelated to the execution of a target instruction.

Synchronous exceptions may, furthermore, be of either of two types, namely, transparent and non-transparent. A transparent exception is defined as an exception requiring processing action wholly within the target computer system; a non-transparent exception is defined as an exception requiring processing that alters a visible state of the source system. In this case, some embodiments of the invention may further determine whether a sensed synchronous exception is transparent or non-transparent. Each transparent synchronous exception may be handled externally from the source system so that the visible state of the source system remains unaltered. Each non-transparent synchronous exception may be forwarded to the source system for processing.

According to one method used in some embodiments of the invention for forwarding each non-transparent synchronous exception to the source system, the sensed exception is converted into a simulated source exception in a source instruction stream, which is sensed by and interrupts the source system.

Upon sensing the presence of an asynchronous exception during execution of a current one of the translated target instruction sequences, the system according to some embodiments of the invention preferably delays processing of the sensed asynchronous exception until completion of the remaining target instructions in the current translated target instruction sequence. One manner in which some embodiments of the invention accomplish this is by determining a source instruction pointer as a predetermined function of the final target instruction pointer; forwarding and processing the sensed asynchronous exception; and then resuming execution at the location in the translation cache that corresponds to a current source instruction pointer. Asynchronous exceptions are thereby processed only upon completion of execution of the translated target instructions corresponding to whole source instructions.

In the preferred embodiment of the invention, processing of a sensed asynchronous exception is delayed by a) temporarily replacing with a trap generation instruction the initial target instructions in each of the translated target instruction sequences that correspond to target instruction sequences that possibly immediately follow the current target instruction sequence; b) resuming execution of the current target instruction sequence from the point at which the asynchronous exception was sensed; c) restoring each of the temporarily replaced instructions with their original content after completion of the processing of the sensed asynchronous exception; and d) upon reaching the trap generation instruction, forwarding and processing the sensed asynchronous exception. Alternative methods embodiments of the invention may use to process a sensed asynchronous exception include simulating or single-stepping execution of the remaining target instructions.

Alternatively, a trap generation instruction may be used to replace each indirect branch instruction, where each indirect branch instruction corresponds to a possible last instruction of the current target instruction sequence. Execution of the current target instruction sequence is then resumed from the point at which the asynchronous exception was processed, each of the temporarily replaced instructions is restored with their original content, and the restored indirect branch instruction is simulated.

In the preferred embodiment of the invention, the source system is a virtual machine and a virtual machine monitor is operationally installed between the virtual machine and the hardware target computer system so that the virtual machine runs on the virtual machine monitor. The processing steps of converting the source instructions into corresponding target instruction sequences by binary translation, executing the translated target instruction sequences, sensing the presence of an exception, and delaying application of the sensed exception, are, in this preferred embodiment, carried out by the virtual machine monitor.

DETAILED DESCRIPTION

General System Configuration

Figure 1:
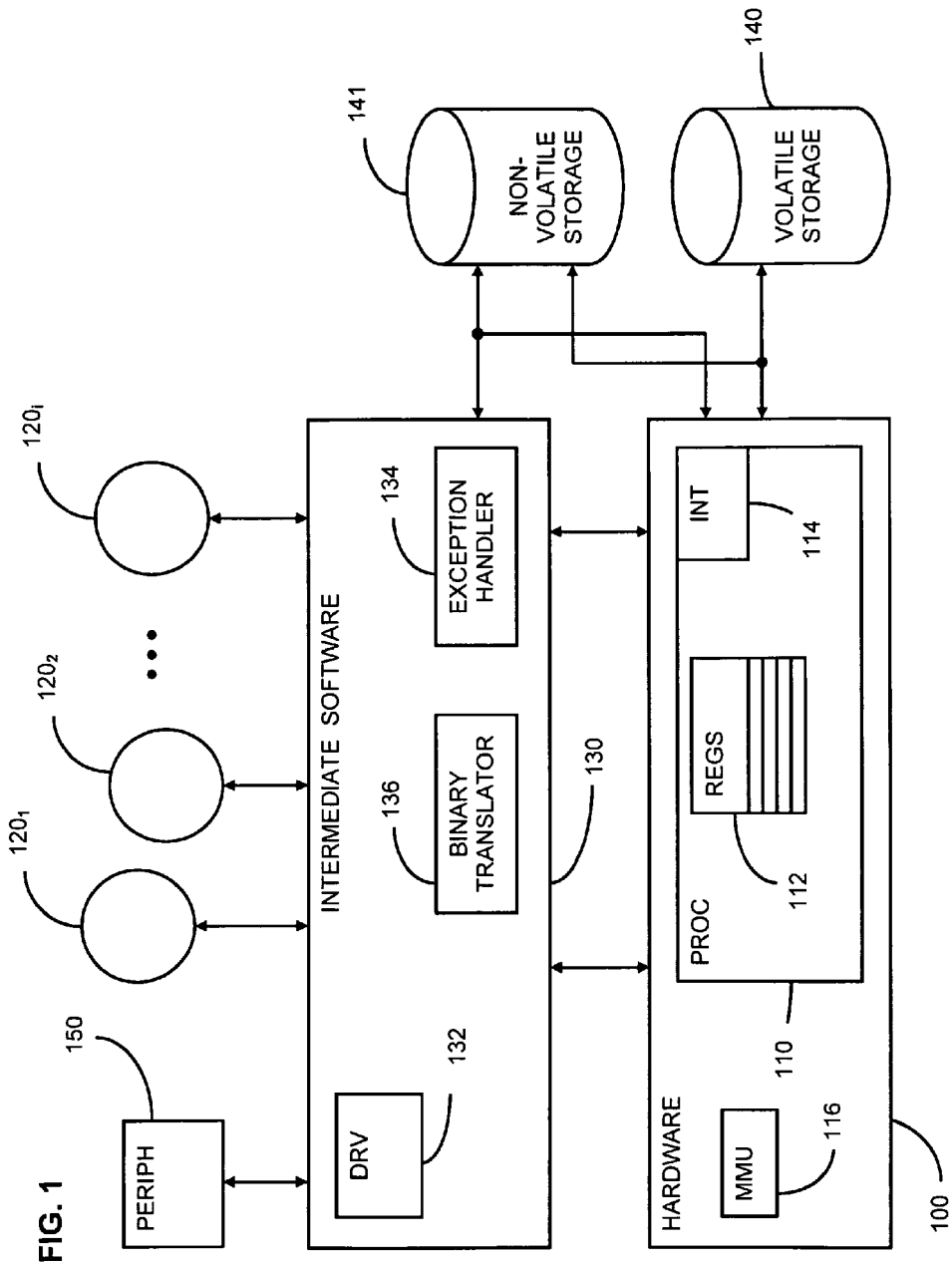
FIG. 1 is a block diagram of the main system components of the invention in its general form.

FIG. 1 illustrates the main hardware and software components of the invention, in their broadest sense. System hardware 100 includes a processor 110 (or two or more cooperating processors in a known multiprocessor arrangement), which includes, or is connected to, registers 112, interrupt-handling circuitry 114, and a conventional memory management unit (MMU) 116. Various conventional applications $120_1, 120_2, \ldots, 120_i$ communicate with the hardware 100 and other system components via intermediate software 130. In most conventional systems, this intermediate software is an operating system. In the preferred embodiment of the invention, the intermediate software is "dual," in that it includes both an operating system and a virtual machine monitor (VMM); this is explained and illustrated below.

Standard volatile and non-volatile storage devices 140, 141, respectively referred to collectively as "storage" or "memory"—are connected to the hardware 100 and can be accessed by the intermediate software 130, by the hardware 100, or, in some circumstances, directly by applications. Conventional peripheral devices 150 are also connected either for direct control by the hardware 100 or via the intermediate software 130. The intermediate software 130 includes device drivers 132 for the various peripherals 150. Thus far, the main components of the computer system illustrated in FIG. 1, as well as their implementation and operation, are as in almost every common computer system and are as such very well known.

What is also well known is that requests by applications $120_1, 120_2, \ldots, 120_i$ for managing and mapping memory, for control of peripherals 150 or access to data regarding their settings, etc., can be handled in whole or in part by the intermediate software 130. In cases in which the intermediate software is, or at least includes, operating systems such as those made by Microsoft, an Applications Program Interface (API) is usually included, for example, specifically to act as the interface between the operating system and applications. The operating system is also responsible for tracking memory portions allocated to each application, and for handling or at least setting up most data transfer between memory, applications and peripherals.

This invention is directed to the handling of exceptions in the context of binary translation of source instructions issued by applications and intended for execution as target instructions by an underlying system, which, in most cases, will be the hardware processor, but may also be some other underlying software on which the respective application is installed. Accordingly, the intermediate software 130 according to the invention also includes an exception handler 134 and a binary translator 136, both of which may be implemented as software modules using normal programming techniques.

Preferred System Configuration, Including Virtualization

Figure 2:
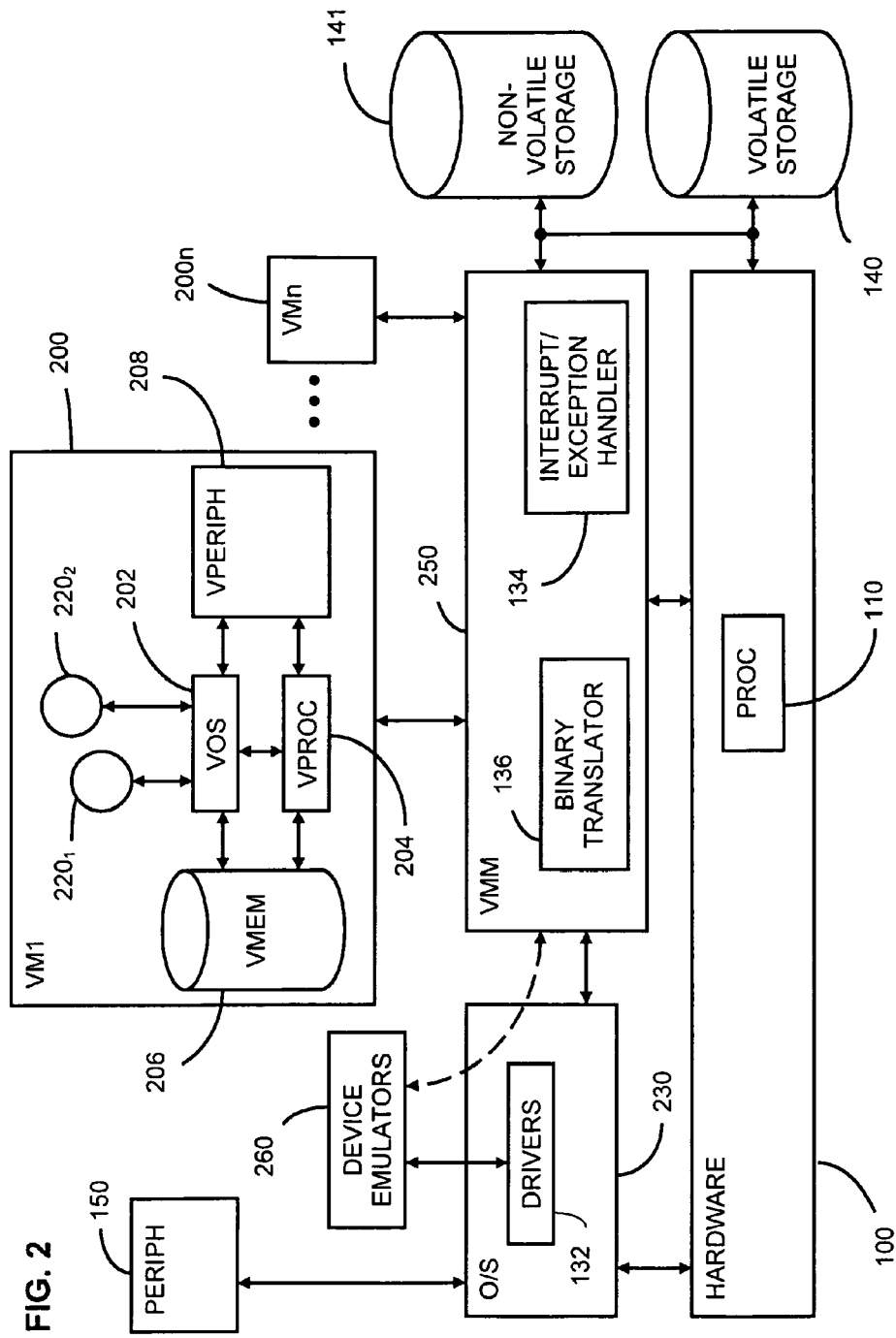
FIG. 2 is a block diagram of the main system components of the preferred embodiment of the invention, with one or more virtual machines running on a virtual machine monitor, which is installed at the same system level as a host operating system.

FIG. 2 shows the system configuration in a preferred embodiment of the invention. In this preferred embodiment, the intermediate software comprises two main components—an operating system 230, which includes the drivers 130, and a virtual machine monitor (VMM) 250, which includes the exception handler 134 and the binary translator 136. In this embodiment of the invention, the VMM 250 is thus at the same system level as the operating system 230 itself, with both communicating directly with the hardware 100. This configuration, as well as its advantages, are described in the co-pending U.S. patent application Ser. No. 09/179,137, "Virtualization System Including a Virtual Machine Monitor for a Computer with a Segmented Architecture," filed 26 Oct. 1998, which is incorporated herein by reference.

Virtual Machines

As is well known, a virtual machine is a computer "system" that is typically implemented entirely in software on top of a "real," that is, physical, hardware platform and a "real" operating system, that is, an operating system that communicates directly with the hardware platform and other physical system components such as memory. In other words, a virtual machine is software that emulates a particular architecture and operating system, although actual processing and data storage is of course performed on the actual physical components, which are otherwise unknown to actual applications running on the virtual machine. The design and operation of virtual machines is well known in the art of computer science. Indeed, most modern personal computers include at least one virtual machine: A computer whose operating system is Microsoft Windows or Windows NT, for example, will allow most applications designed to run under the earlier Microsoft DOS to run on the Microsoft Windows or Windows NT machine as well. This is because such computers include a DOS virtual machine that runs on top of the Microsoft Windows and Windows NT operating systems.

FIG. 2 illustrates a virtual machine 200 running on a virtual machine monitor 250. The virtual machine (VM1) 200 includes a virtual operating system (VOS) 202, a virtual processor (VPROC) 204, a "virtual disk," that is, virtual memory (VMEM) 206, and virtual peripheral devices and/or device drivers 208, all of which are implemented in software to emulate the corresponding components of an actual computer. The emulation of the virtual processor 204 will include emulations of, for example, the interrupt lines, flags, internal registers, etc., that would be found in an actual hardware processor. Note, however, that it is not necessary for the emulated, virtual processor to have the same structure as the hardware processor of the actual physical system.

Applications $220_1$, $220_2$ (only two of which are shown merely for the sake of simplicity) are "loaded into," that is, associated with, the virtual machine 200 and run normally. Of course, all of the applications $220_1$, $220_2$, and the components of the virtual machine 206, are instructions and data stored in memory, just as any other software. Indeed, the same applies to other system software as well, such as the operating system 230 itself. These various software components are illustrated as separate modules merely for the sake of clarity.

The applications $220_1$, $220_2$ pass their instructions (the "source" instructions) directly to the virtual operating system 202 instead of to the "actual" operating system 230 and are in the form suitable for running on the type of processor that the virtual processor 204 emulates. In reality, however, all instructions generated by the applications will ultimately be executed on the actual hardware 100 as corresponding hardware instructions (the "target" instructions), using actual peripheral devices 150 accessed and controlled by the operating system 130.

In some implementations of the invention, binary translation may be used to convert every source instruction into at least one corresponding target instruction. This is a common solution, but every binary translation of a source instruction that could have been executed directly by the hardware causes a delay that could theoretically be avoided. U.S. patent application Ser. No. 09/179,137 discloses a system and a method for virtualizing a computer that in fact avoids this delay by implementing both binary translation and direct execution within a single virtual machine monitor, as well as a mechanism for switching to binary translation only when direct execution is not possible. Specifically, it runs the virtual operating system with reduced privileges so that the effect of any instruction sequence is guaranteed to be contained in the virtual machine. Because of this, the VMM must handle only the traps that result from attempts by the virtual machine to issue privileged instructions.

This invention involves an improvement in a binary translator, and as such does not depend on the use of a virtual machine monitor or other intermediate software that allows both binary translation and direct execution; nonetheless, this invention is particularly advantageous when used in the binary translator described in U.S. patent application Ser. No. 09/179,137, since it provides even greater speed with precise exception handling.

Depending on how the interface between the virtual machine and either the hardware or the system operating system is handled, more than one virtual machine $200, \ldots, 200n$ may be included in the system as a whole. In FIG. 2, the main components of only one virtual machine 200 are illustrated merely for the sake of simplicity—other virtual machines will have a similar structure. Note, however, that different virtual machines may have (but do not require)

different virtual operating systems, different applications, etc. Moreover, in some known implementations, virtual machines are run directly on top of the operating system 230. As such they constitute applications like any other, for example, the applications $120_1, \ldots, 120_i$ shown in FIG. 1, except that they themselves have applications running on them.

Preferred Virtual Machine Monitor (VMM)

In order to overcome the limitations of the embodiment described above, in which the virtual machines run directly on the operating system 130, the preferred embodiment of the invention instead interposes the virtual machine monitor 250 between the virtual machines 200, ..., 200n and the system hardware 100. As is well known in the art, a virtual machine monitor is a layer of software that runs directly on top of the hardware and virtualizes all the resources of the machine. Since the interface exported by the virtual machine monitor to the virtual machines is the same as the hardware interface of the machine, the virtual operating system 202 cannot even determine the presence of the VMM. Consequently, when the hardware interface is compatible with the underlying hardware, the same operating system can run either on top of the virtual machine monitor or on top of the raw hardware.

Figure 3:
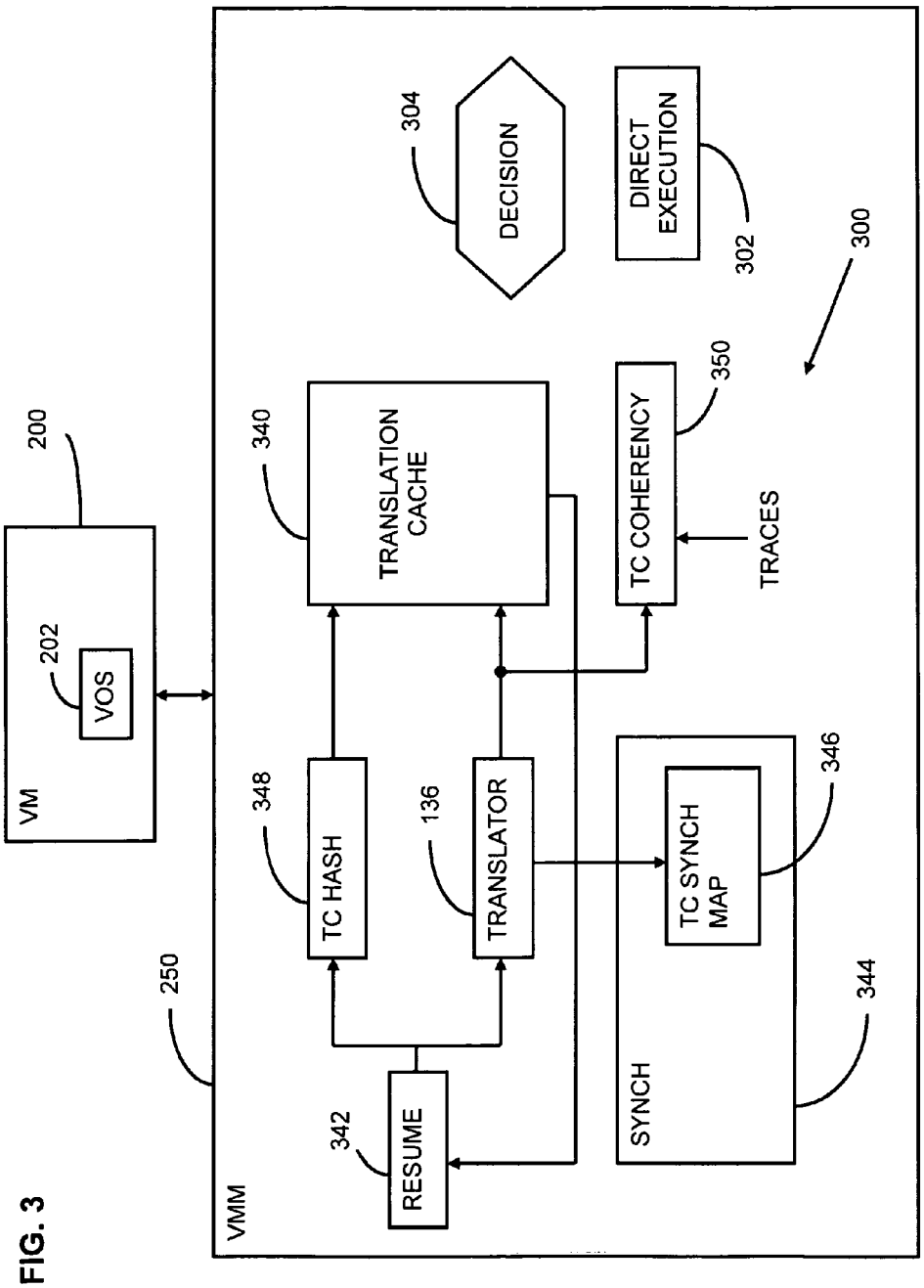
FIG. 3 shows a dual execution-mode—direct execution and binary translation—virtual machine monitor used in the preferred embodiment of the invention, as well as the components of the preferred binary translation subsystem.

See FIG. 3. There are three main portions of the VMM 250 according to the preferred embodiment of the invention: a binary translation execution engine 300, a direct execution engine 302, and a decision sub-system 304 that determines which execution mode to use. The concepts and general techniques of binary translation and direct execution are well known in the art. As is mentioned above, in the preferred embodiment of the invention, however, the VMM 250 incorporates both execution modes, as well as the decision sub-system 304, which selects between the two. This invention is directly primarily to the binary translator 300; accordingly, most of the following discussion involves this sub-system. Furthermore, the details of the dual execution-mode operation of the VMM 250 used in the preferred embodiment of the invention are laid out in U.S. patent application Ser. No. 09/179,137. Nonetheless, for completeness, the main components of both execution sub-systems, and the preferred mechanism for switching between them, are briefly discussed here.

Direct Execution Sub-System

There are several known direct-execution execution engines. Any known design may be used in the preferred embodiment of the invention as execution engine 302. For example, prior systems such as VM/370, DISCO, and Hypervisor are based exclusively on direct-execution techniques.

Note that this invention is independent of the choice of the direct execution engine. Indeed, since this invention applies to binary translation, it may be used in systems that rely solely on binary translation, and do not implement direct execution at all, and in systems in which binary translation is carried out in intermediate software other than a VMM. The following discussion of the dual execution-mode operation of the VMM is included only because the VMM used in actual, working implementations of the preferred embodiment of the invention has this novel feature.

Direct execution is a technique that allows the virtual machine monitor (VMM) to let the virtual machine directly execute its instruction sequences on the underlying hardware processor. However, if the VMM sets up the processor with reduced privileges, then the effect of these instructions is guaranteed to be contained to the virtual machine. Consequently, the VMM should preferably never allow the processor to be effectively set at the lowest (most) privileged level, even when the operating system in the virtual machine requests it.

Instruction set architectures with non-virtualizeable instructions, that is, instructions that behave differently depending on the state of the processor, cannot lead to the design of virtual machine monitors based exclusively on direct execution. However, direct execution may be used to execute the virtual machine whenever privileges need not be reduced, for example, when the virtual machine is executing unprivileged application programs. Indeed, the use of direct execution to virtualize an Intel x86 architecture also leads to substantial performance improvements over systems that rely exclusively on binary translation since it allows the direct use of all the hardware components. On the other hand, dynamic binary translators such as the ones used in existing virtual machine monitors and machine simulators suffer from substantial overhead, even when they can directly use substantial portions of the memory management unit and the segments.

For example, the direct use of the underlying hardware leads to significant speed improvements over machine simulators such as Shade and SimOS. Second, the system according to the preferred embodiment of the invention runs advantageously on commodity Intel-x86 compatible processors, unlike DAISY and Crusoe where the processor and binary translator were specifically designed jointly, and as a result the processor contains additional special-purpose support to facilitate the binary translator. Third, the system according to the preferred embodiment of the invention uses the hardware features of the x86 architecture itself to efficiently emulate other x86 codes.

Memory Tracing

Memory tracing is another element of the preferred embodiment, which notifies different components of the system of specific memory accesses and relies on hardware exceptions (page faults) to detect these accesses. It is also one example of the use of synchronous exceptions that are transparent to the execution of the virtual machine.

Memory tracing is the ability of the VMM to set read-traces or write-traces, or both, on any given physical page of the virtual machine and to be notified of all read and/or write accesses made to that page in a transparent manner. This includes not only the accesses made by the virtual machine running either in binary translation or direct execution mode, but also the accesses made by the VMM itself. Memory tracing is transparent to the execution of the virtual machine, that is, the virtual machine cannot detect the presence of the trace. Moreover, the memory tracing mechanism may request that the set of locations to be traced should be specified with a given granularity, for example, one that would match the page size. Some form of memory tracing mechanism is preferably included in the system according to the invention in order to efficiently support translation cache coherency (described below with reference to the "binary translation sub-system"), and to virtualize segmented architectures.

The memory tracing mechanism implemented in the preferred embodiment of the invention is described in detail in U.S. patent application Ser. No. 09/179,137, "Virtualization System Including a Virtual Machine Monitor for a Computer with a Segmented Architecture," which is incorporated here by reference. The memory tracing mechanism described in that application uses a combination of the processor's memory management unit (MMU) 116, via page faults, and the ability, using either hardware or software (in particular, the binary-translation sub-system) to execute instructions one-by-one, that is, to single-step the virtual machine. The memory tracing mechanism can be implemented on top of the mechanism that virtualizes the physical address space of the virtual machine. This latter mechanism is present in conventional virtual machine monitors that support multiple virtual machines and can be implemented using known techniques. In the preferred embodiment of the invention, it is implemented by having the VMM manage the MMU through an address space separate from the one managed by the VM.

Binary Translation Sub-System

FIG. 3 also shows the general structure of binary translation execution engine 300 or sub-system according to the invention. The binary translation subsystem is responsible for the execution of the virtual machine whenever the hardware processor is in a state where direct execution cannot be used. Although the binary translator in the preferred embodiment of the invention is a so-called dynamic binary translator, in which code translations are generated at run-time, interleaved with the execution of the translations, this invention also applies equally to the field of static binary translators, which perform all code translations before they are executed.

The binary translation execution engine 300 in the preferred embodiment of the invention contains several sub-systems, which, as is well known, are implemented as either stored instruction sequences (programs), addressable portions of system memory, or both. These sub-systems include the binary translator 136, a translation cache (TC) 340 a central loop sub-system (Resume) 342, a synchronization sub-system 344 that includes a TC synchronization map 346, a TC hash table 348, and a TC coherency sub-system 350; these are described below. The core of any binary translation execution engine is the translator 136. As is well known, such a translator reads a sequence of instructions from the virtual machine 120 and generates a corresponding sequence of instructions that emulates the original code sequence by applying the semantics of the source instructions to the state of the virtual machine and its virtual processors. For example, if the original sequence from the virtual machine contains a privileged instruction, then the translator 136 emits a code sequence that emulates that privileged instruction, possibly without even issuing any privileged instructions. The emitted code sequence may also contain code that calls support routines of the VMM; such sequences are commonly referred to as "callouts." Any known techniques may be used to design the translator 136.

Translations are stored in a large buffer, namely, the translation cache 340. This is also a known technique. An access function, that is, the TC hash table 348, keeps a map of the starting instruction pointers of the virtual machine that have a translation, together with the starting address of the corresponding emitted sequence in the translation cache 340. In other words, once an instruction or instruction sequence from the virtual machine is received and translated, and the translation is stored in the TC, the TC hash table 348 stores the respective starting points of the sequences. This allows translations to be reused, at least as long as the original sequence has not changed. This, in turn, speeds up the system, since unchanged instructions from the virtual machine do not need to be retranslated every time the VMM receives them.

The code sequence emitted by the translator 136 preferably ends with a callout to the main loop 342 to emulate the next sequence of instructions. To avoid calling the main loop too often, the binary translation execution engine 300 used in this invention preferably uses a technique known as "chaining." This is also a well-known technique that allows an emitted sequence to directly jump to the start of another emitted sequence. As in conventional systems, the central loop 342 is also preferably used by the VMM to call out to support routines; in the invention, such routines are those that are designed in any known way to emulate the desired architecture.

The translation cache coherency subsystem 350 ensures that the translations that are stored in the TC are executed only if the corresponding source instruction sequence has not been modified since the time of the translation. Any modification to any instruction that was used as the input of the binary translation renders all the translations that relied on this instruction incoherent—incoherent translation fragments must never be allowed to be executed. It is the role of the translation cache coherency subsystem to detect such changes, and to take the appropriate steps to prevent the execution of such fragments. Any known technique that provides such guarantee may be used. For example, a known and simple technique used in the SimOS machine simulator detects (through the simulation of the memory management unit) any write to any page that was used as the input of the binary translator and flushes the entire translation cache if such a write occurs. The Transmeta Crusoe chip, as presented in U.S. Pat. No. 5,832,205, uses a similar mechanism, referred to as a "T-bit," to detect violations by adding a bit into the memory management unit (namely, the "T" bit) that is set by the binary translator on certain pages with translations and triggers an exception when referenced. In the preferred embodiment of the invention, the techniques disclosed in co-pending U.S. patent application Ser. No. 09/203,825 ("Dynamic Binary Translator with a System and Method for Updating and Maintaining Coherency of a Translation Cache"), which is incorporated here by reference, are used to efficiently ensure translation cache coherency.

In order to understand the synchronization sub-system 344 one must keep in mind certain aspects of the translator 136. Note first that instructions or instruction sequences from the VM that are input to the translator 136 are indivisible or "atomic," that is, they are either completed in full or they are not considered to have been executed at all. The manner in which this invention coordinates the execution of target instructions so as not to destroy the indivisibility of the corresponding source instructions is described below. The result of the translation of even a single instruction input to the translator 136 may, however, be more than one instruction; similarly, it is not at all certain that a sequence of n instructions input to the translator will result in exactly n instructions in the translation.

The reason this can be a problem is that, for example, an exception might occur during the execution of the translated sequence, which might then not be at the same point as, that is, in synchronization with, where the original instruction would have been. It is therefore necessary to guarantee the "atomicity" of the virtual machine's instructions if the operation of the VMM is to be transparent to the VM. As part of this safeguard, if an exception occurs during the middle of execution, then the system needs to restore the state of the VM to its previous execution entry point, that is, to the beginning of the instruction. The translator 136 thus has two outputs: 1) the code generated to for execution (the translation); and 2) a pointer into the TC synchronization map 346 so that it will be possible to reverse portions of the execution.

The TC synchronization map 346 is a table that partitions the TC 340 into regions of different lengths. Each region is associated with the address of the instruction used as the source of the translation and a type that uniquely identifies how the translation was performed.

There are two main ways of simulating execution of the instruction pointer (IP) for the virtual machine. One method is to increment the IP for each instruction. Although simple, this method is very expensive in terms of processing time. Another method—that preferred in this invention—is to store the IP for each TC region in the map 346. On the rare occasion when the system needs to know the position within any given region of the TC, it can then recompute the corresponding IP.

Translation Cache Coherency

Binary translators achieve high speeds by converting an input instruction stream into a target instruction stream, and caching these translations so that the subsequent execution of the instruction stream can reuse the same target instruction sequence. Translation cache coherence is the guarantee that the binary emulator will detect changes in the original code so that it can update the emitted code accordingly. Translation-cache coherency can be implemented exclusively using the memory tracing mechanism described above.

The concepts and techniques for maintaining translation cache coherency are well known in the field of system virtualization and are therefore not discussed in greater detail here. Any conventional method may be implemented to ensure translation cache coherency in the invention. The decision about which method to use will depend on a given system's requirements for performance, memory availability, and simplicity.

Synchronous Exception Classifications

The general definition of synchronous and asynchronous exceptions is given above. According to the invention, synchronous exceptions are further classified into two categories—transparent exceptions and forwarded exceptions—by the virtual machine monitor 250 (or the run-time system otherwise implemented as the intermediate software 130). Transparent exceptions are those that are handled internally by the virtual machine monitor, so that the execution of the translated code is subsequently resumed, without having any side-effect on the state of the virtual machine that is visible to the virtual machine itself. Forwarded exceptions are those that are converted by the run-time system from an exception that occurred during execution of the target instruction stream into a simulated exception of the source instruction stream that is visible to the virtual machine. The conversion will, for example, require that the exception instruction pointer (stored in a special register or on the stack depending on the architecture) be converted from a target instruction pointer into a source instruction pointer; this is described in greater detail below.

Asynchronous Exceptions

In the preferred embodiment of the invention, the virtual machine monitor 250 handles asynchronous exceptions. For example, if an interrupt is raised as the result of the completion of a disk request completion, then a corresponding disk device driver in the virtual machine monitor must handle it appropriately, or execute the host operating system's device driver. The handling of the interrupt may lead to changes in the state of the virtual machine, and in particular of its virtual devices 208. For example, a (real) disk completion interrupt may also indicate that a virtual disk request has completed, and that a virtual disk interrupt should be raised. In this case, an asynchronous exception should be simulated to the virtual machine and made visible to it. Analogous to synchronous exceptions, asynchronous exception may or may not be transparent to the execution of the virtual machine. However, the effects of a non-transparent asynchronous exception on the virtual machine differ from the effects of a synchronous exception, as is explained below in conjunction with the discussion of monitor actions.

General Properties, Forwarding and Handling of Exceptions

In both cases of exceptions, the processor is unable to execute its next instruction, either because the parameters of the instruction cause an error (a synchronous exception), or because the processor must first do something else. The general properties of the exception model used in this invention are therefore 1) that exceptions occur at instruction boundaries (atomic execution); and 2) the system is able to be restarted, with the system saving (for example, on the system stack) enough information (at least the instruction pointer IP) to return execution to the point where the exception occurs.

The main steps taken by the binary translation subsystem according to the invention are:

1) When an exception occurs, control is transferred to the VMM, or to whatever intermediate software supervises the binary translation.

2) If the exception can be handled internally by the VMM, with no visible effects on the virtual machine state, then the VMM handles the exception and resumes processing at the target instruction specified by the hardware processor at the time of the exception as the restarting point.

3a) If the exception that occurs is synchronous, and cannot be handled internally by the VMM, that is, the VM is responsible for the occurrence of the exception, then the synchronous exception is forwarded to the virtual machine, so that the VM acts as if the exception occurred within it. An example of this would be a non-existent memory mapping, in, for example, a lazy-mapping management in the VM.

3b) If the exception that occurs is asynchronous, then a VMM action is generated, and a change of state is applied to the VM by the VMM at the next VM instruction boundary. This provides a "clean" or "convenient" point for VM state changes.

The requirements for the forwarding of asynchronous exceptions differ from the requirements of the forwarding of synchronous exceptions: Whereas synchronous exceptions should be forwarded without delay, the forwarding of asynchronous exceptions may be delayed until a "convenient point" is reached. As will become clear from the discussion below, the choice of the "convenient point" has wide implications for the design and implementation of the system. For one thing, some mechanism is needed to enable the VMM to know just where the next instruction bound is. This mechanism is described below.

The binary translator according to the invention, which is preferably part of the virtual machine monitor 250, needs to efficiently handle both types of exceptions (synchronous and asynchronous), and to do so in a precise manner, that is, without further delay.

As is mentioned above, the three components of the preferred embodiment of the invention that allow co-location of the VMM 250 with an unmodified host operating system 230. The details of these components are described in U.S. patent application Ser. No. 09/151,175 ("System and Method for Virtualizing Computer Systems"), filed 10 Sep. 1998. Although this configuration is not essential to the implementation and use of this invention, it is preferred since it avoids the delay and complication inherent in requiring the VMM to drive devices for which the host operating system already has efficient drivers. The key features of this arrangement are:

1) A application component, namely, a device emulation module 260 runs at user level as a process or set of processes on top of the host operating system 230. This application component 260 initializes and configures the (or each) virtual machine, to simulate some devices of the virtual machine(s), and can be implemented using known programming techniques. As part of this simulation of devices, the application 260 also calls into the host operating system to access the underlying devices or resources.

2) A driver (one of the drivers 132) is installed in the host operating system. This driver is used primarily to allow the switch between the host operating system context and the virtual machine monitor context. The driver is also used to call driver-level functions of the host operating system on behalf of the application 260 or the VMM, such as for example the pinning of memory pages.

3) The VMM executes with total control over the entire system, that is, in an environment in which the host operating system is temporarily suspended. The VMM is, however, structured to access only those system resources that have been previously allocated or reserved by the host operating system. For example, the VMM manages the address space of the processor while executing in its context. However, the VMM inserts mappings only into the address space that refers to pages in memory that have been allocated and pinned by the host operating system. Such cooperation allows the co-location of the VMM with a host operating system, which is then not even aware of the existence of this system-level component.

The virtual machine executes in the VMM context using a combination of direct execution and binary translation virtualization techniques. In the preferred embodiment, the VMM interacts with the driver and the application component 260 by performing a remote procedure call (RPC) to either the driver component or the application component. The driver or application component then interacts with the host operating system, typically using standard APIs. For example, a subsystem that virtualizes IDE disk drives may be included in the VMM, which then makes an RPC to the device emulation component 260 to initiate a disk read or write request. To allow for an overlap of the disk request with the execution of the virtual machine, the application component 260 may use either a separate thread or process to perform the read or write request, or an asynchronous API to perform the call.

When executing in the VMM context, all exceptions and interrupts are handled by the VMM itself. In contrast, device interrupts are preferably forwarded directly to the host operating system for processing. The host operating system then handles the device interrupt as though it had occurred in its context. Upon completion of the handling of the interrupt in the host context, the driver then typically returns to the application component 260.

One advantage of this return to the user-level application 260 is that it allows the host operating system to make a scheduling decision, thereby allowing other processes to run at this point. This is consistent with the general approach used in the preferred embodiment of the invention, which is to always defer to the host operating system for all resource management policies, in this case the management of the processor(s) of the system. The return to user-level also gives the application 260 the opportunity to detect and process the eventual completion of an asynchronous device access done on behalf of the virtual machine.

Consider now the chain of actions that occurs when a disk interrupt occurs. If the disk interrupt occurs while the system is in the VMM mode, then the VMM performs an RPC to the driver 132. The driver 132 then invokes the disk interrupt handler of the host operating system, either by calling it directly or by posting the same interrupt to the host operating system. If the disk I/O was requested by one of the I/O threads of the application component 260, then that thread, which is blocked pending the completion of the disk I/O, is put back into the queue of runnable threads found in the scheduler of the operating system. Upon completion by the interrupt handler, the VM driver regains control and returns control back to the main thread of the application component 260. Before going to user-level, the host operating system may, however, make a scheduling decision that runs the I/O thread. If scheduled, then the I/O thread will eventually determine that the virtual machine disk I/O request has completed. This leads to a raising of an external interrupt line of the virtual machine's virtual processor 204, effectively modifying the state of the virtual machine's virtual processor. Control eventually returns to the VMM to complete the RPC and resume execution at the call site of the RPC.

The description above of the chain of events ignores two essential elements that relate to the invention: the VMM actions and the handling of these actions upon completion of the RPC. Recall the premise of this example, namely, that this chain of events has been triggered by an asynchronous event (the completion of a disk interrupt), and that no reference was made to the state of the virtual processor and its eventual synchronization with the state of the interrupted (real) processor.

To simplify the implementation, and for other reasons that will become clear later, the elements of the preferred embodiment of the invention that are executed as the result of external interrupts do not directly modify the state of the virtual processor, but rather enqueue a virtual machine monitor action that describes the state change. In the case of the completion of a virtual disk request, the VMM would simply describe the virtual interrupt line to be raised.

Upon completion of the RPC, the VMM interrupt handler must decide whether to resume execution at the exact location where the interrupt originally occurred, or whether some other action is appropriate. Of course, this decision will be a function of the presence or absence of monitor (VMM) actions. If no VMM actions have been enqueued, then execution can always resume at the point of interruption. On the other hand, if monitor actions have been enqueued, then appropriate action must be taken.

Restatement of Problem

The general statement of the problem solved by this invention (precise handling of both main types of exceptions in the context of a binary translator) is found above. With the help of the definitions and concepts just introduced, however, the problem can be restated more specifically as follows, in the context and with the terminology of the preferred embodiment of the invention: The VMM 250 must have mechanisms to handle and forward synchronous exceptions generated by the execution of the virtual machine(s) in both direct execution and binary translation. Furthermore, the virtual machine monitor must be able to handle external interrupts that can occur either when the virtual machine is running in either direct execution or binary translation, or when the virtual machine monitor itself is executing. In all cases, the interrupt handler must provide a mechanism that guarantees the eventual processing of all pending VMM actions.

VMM actions used by the portions of the system that are asynchronous to the execution of the monitor are used for various purposes in the VMM in the preferred embodiment of the invention. Here, a "monitor action" is a sequence of changes in the state of a virtual machine that are to be applied at the next VM instruction boundary. They are, for example, used to raise and lower interrupts from the device emulation sub-systems at user-level.

By way of example, monitor actions are also used by the application component 260 to indicate particular actions that need to be performed by the VMM at the next consistent virtual machine state. For example, the preferred embodiment of the invention includes a virtual graphics card device, which consists of two major components: a VMM component and an application component. The VMM component reflects the changes to the graphics card that have been requested or made by the virtual machine. The application component (part of component 260) asynchronously makes the required calls to the graphical window manager of the host system to reflect the changes requested by the virtual machine. Once the application component has applied a set of screen updates, it generates a monitor action that, when processed by the VMM, reflects the necessary changes. The monitor action in this scenario is thus used when the virtual graphics card uses a page fault-based mechanism to determine which portions of the frame buffer have been modified. The monitor actions re-protect the pages of the frame buffer that had been modified since the previous update operation.

Each entry in the buffer leads to a call to the host graphics subsystem. Upon completion of these actions, a monitor action is raised that is used by the monitor 250 to reset some internal state, including the address mappings of portions of the virtual frame buffer.

In this example, as well as other cases, the subsystems rely on a very precise guarantee, namely, that the monitor action will be processed at the latest at the next virtual machine instruction boundary. Certain subsystems, such as the graphics subsystem, rely on this guarantee for synchronization purposes. Others do not need to rely on the guarantee for correctness, but nonetheless benefit from it to improve performance. For example, it allows various device emulation subsystems such as the disk subsystem to raise the interrupt line of the virtual machine with minimal latency because only the current source instruction needs to complete execution.

This differs from approaches used in the prior art, which typically do not offer such a guarantee. For example, Shasta, a distributed memory system built around a binary translator, also has a requirement to handle frequent asynchronous actions (in that case, cache-coherency invalidation). Unlike this invention, however, the Shasta system provides a less-precise guarantee that simply states that the asynchronous event will be handled, on average, within a small delay. This difference in the guarantees offered by the system has a profound implication on the implementation. For example, the Shasta system uses a polling technique that relies on a simple instrumentation of all backward branches and return instruction to check for an event flag.

Unlike approaches used in the prior art, this invention provides such a guarantee of precise handling even of asynchronous events.

As is mentioned above, this invention focuses on the handling of synchronous and asynchronous exceptions when the binary translation engine is used; the handling of such exceptions in direct execution is well known in the art of virtual machine monitors and is therefore described here only succinctly for the sake of completeness. In direct execution, the exception state, for example, the instruction pointer, registers, etc., of the hardware processor, is equivalent to the exception state that needs to be simulated to the virtual processor if the exception needs to be forwarded.

To restate: The problem is described with the terminology used in the field of binary translators, and the preferred embodiment is a virtual machine monitor which contains a binary translator. However, the reader skilled in the art will be able to translate the problem and the invention into solutions for problems in related areas. For example, certain modern programming languages and run-time systems such as C++ have built-in support for internally-triggered and externally triggered exceptions. The run-time system is faced in the presence of exceptions with a set of issues such as establishing a consistent state that is similar to the problems described in this present invention.

Examples of Code Expansion

In order to understand the synchronization subsystem 344, one must keep in mind certain aspects of the translator 136. Note first that instructions or instruction sequences from the VM 200 that are input to the translator are indivisible or "atomic," that is, they are either completed in full or they are not considered to have been executed at all. This property of the input instruction sequence is consistent with the one that is typically offered by current processors. However, the output of the translator that corresponds to a single input instruction may be a longer sequence of instructions stored in the translation cache. This expansion of a single instruction expected to be executed atomically into a sequence of instructions leads to the core problem that relates to this invention: The processor cannot naturally guarantee the atomic execution of the corresponding instruction sequence.

Figure 4:
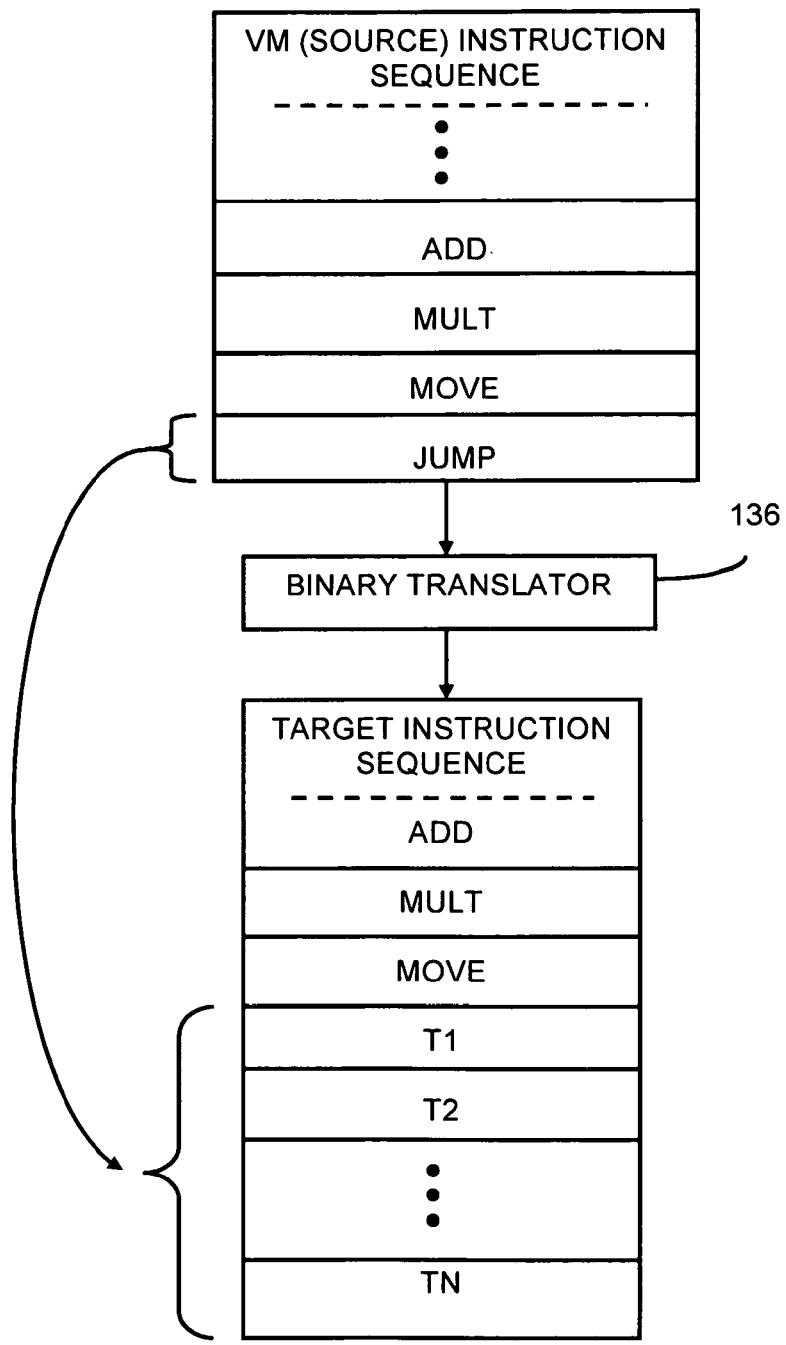
FIG. 4 illustrates code expansion upon binary translation.

FIG. 4 illustrates an example in which ADD, MULT and MOV instructions of a source (virtual machine) instruction sequence are translated one-to-one, whereas a JUMP instruction is translated into an expanded code sequence of n instructions T1, T2, . . . , TN. The VM (source) instruction sequence corresponds to a basic block, with a branch (JUMP) only at the end of the sequence.

Other examples of such expansions include privileged instructions, which are not safe to execute directly in the translation cache. For example, for processors designed to run with an Intel x86 architecture, a "CLI" instruction, which clears the interrupt, will typically be translated into a series of instructions that clear the interrupt flag of the virtual processor. Similarly, segment instructions of the x86 architecture lead to code expansion, as well as non-virtualizeable instructions such as PUSHF and POPF.

Another important class of instructions that lead to code expansion are the instructions that lead to control flow transfers. For example, a "RET" instruction leads to an unpredictable control flow transfer, where the "next instruction" pointer is determined by the value stored at the top of the stack. Such an instruction can be efficiently emulated through different mechanisms known in the art, including the use of a hash table that maintains mappings between instruction pointers of the VM and their location in the TC, and the use of in-line caches, also known as speculative chaining in SimOS. All of these prior art techniques share the property that a single control flow instruction such as RET is converted into an instruction sequence that emulates it.

TC Synchronization Subsystem

As FIG. 3 illustrates, the translator has two outputs: 1) the code generated for the execution, to be stored in the translation cache 340; and 2) entries stored in the TC synchronization map 346. The TC synchronization map is accessed when synchronous and asynchronous exceptions occur, as will become clear below.

In a simple embodiment, the binary translator takes as input a sequence of instructions that ends with a control flow transfer instruction such as branch, call, or return, and that does not contain such control flow sequences instructions within the sequence. Such an instruction sequence is referred to here as a "basic block," which is the term commonly used in the art of dynamic binary translation. This is illustrated in FIG. 4. It should be noted that the term basic block has a different meaning in the art of static compilation.

In one simple embodiment, the binary translator generates code for each instruction of the basic block in a sequential manner, so that the generated code sequence consists of a sequence of instructions or instruction sequences that each correspond to a source instruction. In other words, the sequence of original instructions maps to a sequence of translated instruction sequences.

In this simple embodiment, the binary translator records this mapping as a byproduct of the code generation into the TC-synchronization map 346. Each entry in the map associates a range of bytes in the translation cache 340 (the sequence of generated instructions) with the address of the instruction that it emulates and with a code, the "synchronization code" or "sync-code," that corresponds to the technique used to translate that particular instruction.

A sync-code can be visualized as the row index of a two-column array of subroutines (or address pointers to subroutines), each subroutine corresponding to an exception handler. The one column will be, or point to, subroutines (handlers) to be executed upon occurrence of synchronous exceptions, and the other will be, or point to, handlers for asynchronous exceptions. Each sync-code is thus an identifier, which indicates to the VMM which handler should be invoked if an exception occurs within a given instruction block. (Note that the VMM will also have determined whether the exception is synchronous or asynchronous according to the definitions given above.)

By way of example, a certain sync-code could correspond to the translation of particular privileged instructions, another could correspond to return instructions, and a third one to indirect branch instructions. A special type of sync-code describes instructions that are trivially translated by the binary translator, namely, where the target instruction sequence corresponds directly to the source. For that particular type, a special encoding that groups a sequence of source instructions to a single sync-code is preferably used, since it requires less storage. This grouping is made directly possible by the identity translation, since the source instruction pointer of an exception can be adjusted by adding the offset to the start of the synch region target instruction pointer.

Figure 5:
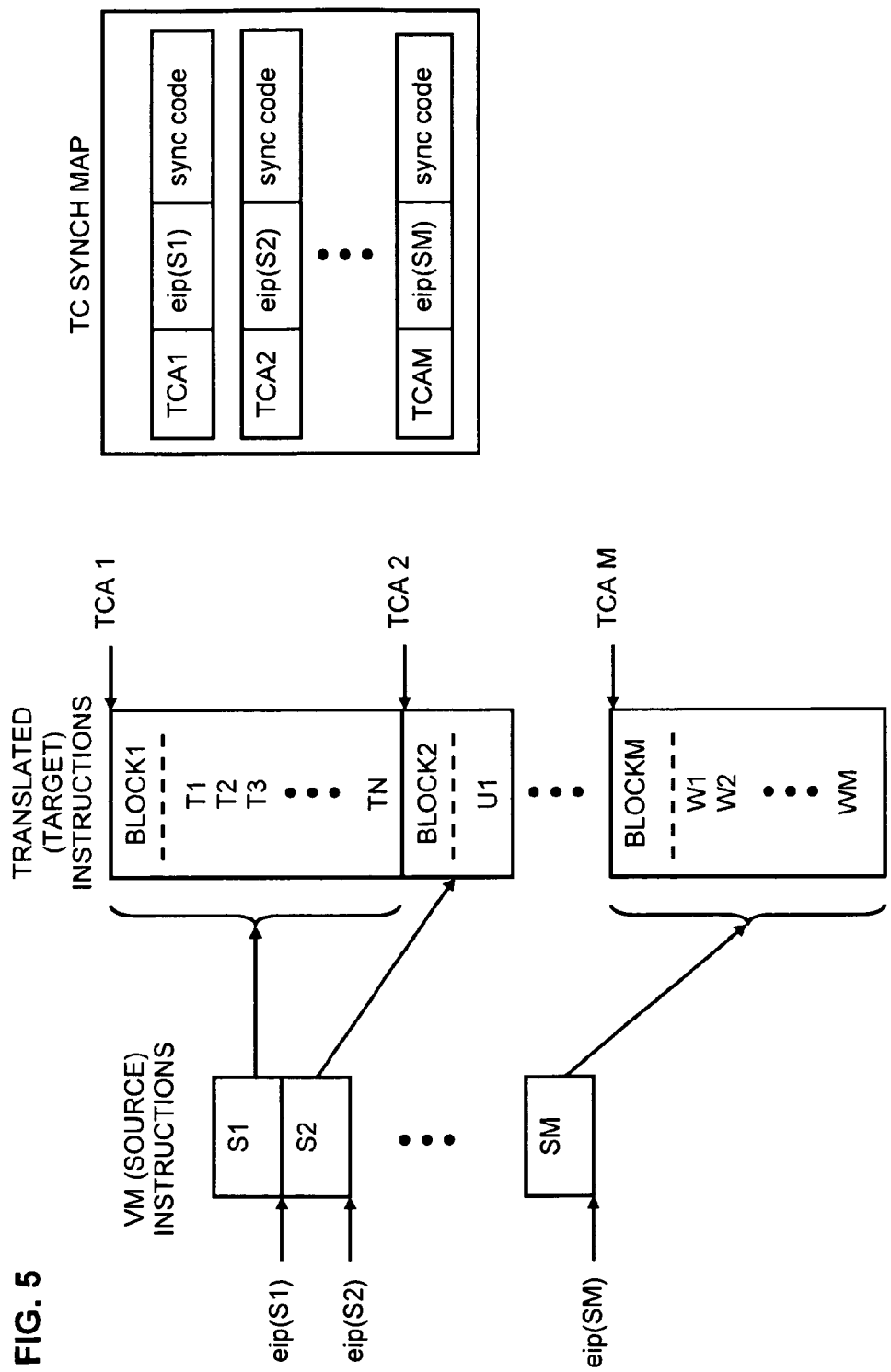
FIG. 5 illustrates synchronization mapping in a preferred embodiment of the invention.

FIG. 5 illustrates the general structure of an entry in the TC-synchronization map according to the invention. As before, VM source instructions S1, S2, SN are translated (by the translator 136) into corresponding blocks BLOCK1 (T1, T2, . . . , TN), BLOCK2 (U1), . . . , BLOCKM (W1, W2, . . . , WM) of target instructions. Note that a "block," as shown in FIG. 5, can consist of a single instruction. The translated instruction blocks are, of course, stored in the translation cache TC 340. The end instruction pointers, that is, the addresses of the source instruction boundaries, of S1, S2, SN, are indicated as eip(S1), eip(S2), . . . , eip(SM), respectively. The beginning translation cache addresses (TCA) of each corresponding translated, cached instruction blocks are indicated as TCA1, TCA2, . . . , TCAM. For each cached instruction block in the illustrated, preferred embodiment of the invention, an entry is stored the TC synchronization map that indicates the TCA of the block, the start instruction pointer (eip) of the source instruction from which the block was translated, and the corresponding sync-code.

The TC-synchronization map can be organized in several different ways, and any organization may be used as long as the entries can be uniquely identified and accessed. For example, it may be implemented as an array of structures that include the starting translation cache address, the starting source instruction pointer, and the sync-code. This is the preferred structure, illustrated in FIG. 5. If the generated code is stored in the translation cache in increasing locations (numerically increasing addresses), then the entries in the TC-synchronization map 346 can also be stored in increasing TCA order. One advantage of this organization is that the end translation cache address can be determined very easily: it is simply the starting translation cache address of the following entry, minus one.

A second and more important consequence of this organization is that one can easily find the synchronization entry that corresponds to any valid translation cache address using a simple and efficient binary search algorithm, which is one of the most well-known, fundamental search algorithms in the art of computer science. As a very simple example, assume that there are seven code blocks, and thus seven TCA's, with relative addresses as follows:

| Synch block number | Relative address |
| --- | --- |
| 1 | 0 |
| 2 | 56 |
| 3 | 134 |
| 4 | 295 |
| 5 | 402 |
| 6 | 593 |
| 7 | 812 |

Of course, other organizations are possible. Assume further that an exception occurs when the instruction pointer is at the relative address 72. The VMM, which will then have control (because of the exception), could simply scan through the TCA portions of the synchronization map entries to determine that the address 72 lies between 56 and 134, so that execution was in block 2 when the exception occurred. In most cases, however, there will be a very large number of blocks, so that such numerically increasing or decreasing scanning will be inefficient. Instead, using a binary search, the VMM can find the "center" entry by taking the average of the highest- and lowest-numbered sync-map entry, with rounding. In this very simple example, this leads to TCA number 4. The address of TCA 4 is 295, which is greater than 72, so the VMM next finds the "half way" point between the fourth TCA and the lowest-numbered TCA. Assume the algorithm rounds down. This would then be TCA number 2. TCA 2=56, which is lower than 72, so the system then calculates the "mid-point" between TCA 4 and TCA 2, which is TCA 3. TCA 3=134, which immediately follows TCA 2 and is also greater than 72. The VMM can thus conclude that execution was in the instruction block with a TCA=56 when the exception occurred. This binary search algorithm is of course very well known in the art. Once the TCA has been determined, then the same sync-map entry will also give the corresponding eip of the source instruction.

According to the invention, the TC-synchronization map is accessed on both synchronous exceptions and asynchronous exceptions that occur while the processor is executing code from the translation cache. Note that it is also possible to have multiple translation caches with different pointers, not only for different virtual machines, or for different applications running on a given virtual machine, but also for different portions of the code for individual virtual machines. Note also that the above description of the synchronization table, as well as of the organization of the data structure, reflects the preferred embodiment of the invention, and that the invention could rely on an alternate layout of the data structure.

Synchronization on Exceptions

When a synchronous or asynchronous exception occurs, the hardware processor 110 saves portions of the physical processor state at the time of the exception. Depending on the processor architecture, this information is saved either in specialized predetermined registers or in predetermined locations in memory such as the top of the system stack. For example, the x86 and compatible processors always save the instruction pointer, code segment, and extended flags register on the top of the system stack. Depending on the processor state, additional information (stack pointer and stack segment, segment registers) may also be saved on the system stack.

As is well known in the art of operating systems and virtual machine monitors, the instruction sequence (the interrupt handler 134) that executes to handle the exception typically first saves additional processor state not saved by the hardware, so that the complete processor state can later be restored and execution can resume at the exception point. If such an exception occurs when the processor is executing out of the translation cache, that is, executing instructions stored in the cache, then the information saved by the processor and the interrupt handler corresponds to the state of the physical processor and not to the state of the virtual processor. For example, the hardware's instruction pointer and code segment will refer to an address within the translation cache, whereas the virtual machine instruction pointer can be anywhere, and at a different location.

According to the invention, when such a synchronous exception occurs and the virtual machine monitor cannot handle the exception internally without side-effects visible to the virtual machine, that is, without affecting the state of the virtual machine, then it forwards this exception to the virtual machine, effectively leaving it up to the virtual machine operating system 202 to recover from the exception. For example, if a page fault occurs at a particular address, then the virtual machine monitor will check (using known techniques) whether the virtual machine's operating system 202 has specified a valid mapping for that address. If it has, then the virtual machine monitor can handle the fault internally, for example, by allocating a new page of memory and establishing a mapping in the existing hardware page table. If it has not, however, then the virtual machine monitor forwards the page fault to the virtual machine by simulating the exception architecture of the virtual processor architecture.

When an exception is forwarded and the exception occurred in the translation cache, that is, as a result of the translated source instructions themselves, then the synchronization subsystem must determine the current virtual processor state as a function of the processor state at the time of the hardware exception and of any additional parameters stored in memory. In a simple embodiment, the TC-synchronization table is searched to determine the TC-synchronization entry that corresponds to the exception instruction pointer. If the exception instruction pointer corresponds to the start of the TC-synchronization entry, that is, the exception occurred at a virtual machine exception boundary, then the virtual processor instruction pointer corresponds to the instruction pointer saved in the TC-synchronization entry. The remaining virtual processor state can then be computed by simply following the conventions used by the binary translator. For example, in one embodiment of the invention, the convention may be that all of the eight "general-purpose" registers of the x86 architecture are mapped by default directly on the hardware registers while executing in the translation cache. In other words, the value of register "EAX" at the time of the exception corresponds by default to the value of the virtual processor register "EAX". Also, in this embodiment, the six segment registers (CS, ES, DS, SS, FS, GS) of the x86 architecture are by convention stored in predefined memory locations at all times.

If, however, the exception instruction pointer of the translation cache does not correspond to the starting address of any TC-synchronization entry, but rather falls in the middle of it, additional appropriate action must be taken to determine the state of the virtual processor when the exception is forwarded. Consider for example a source instruction at location 0x128b, which is a memory indirect call that specifies that the next instruction should correspond to the value stored at address 0x1776. The instruction itself has six bytes, so that the next instruction is at location 0x1291.

0x128b: CALL [0x1776]
0x1291:
can be translated into the following sequence:

| | |
|---|---|
| (t1) mov <gs> BT->tmpEAX, EAX | ;save EAX, which is any chosen register, in a temporary scratch register tmpEAX in the binary translator (BT), or in any temporary storage location that corresponds to a real (hardware) or virtual machine register |
| (t2) mov EAX, [0x1776] | ;move the value at address 0x1776 into the register EAX |
| (t3) push #0x1291 | ;push the return address 0x1291 onto the stack |
| (t4) mov <gs> BT->eip, EAX | ;next instruction, moving EAX into an extended instruction pointer (eip) |
| (t5) move EAX, <gs> BT->tmpEAX | ;restore EAX from the temporary register tmpEAX |
| (t6) jmp ChainingLoop | ;continue from the instruction at the address BT->eip. |

In this example, the register "EAX" is first saved into a temporary location BT→tmpEAX, so that the target of the memory indirect code can be loaded. This loaded value will determine the next instruction pointer. After it has been loaded, the effect of the call instruction on the stack is simulated by pushing the return address 0x1291 on the stack. In this code fragment, BT refers to a data structure, that is a dedicated memory region at a given memory location that is used by the generated code. This embodiment uses the <gs> segment to access this structure.

This example shows mainly how a single instruction (a call) can be translated into an instruction sequence that contains multiple cases where a fault can occur. For example, if the memory indirect address 0x1776 is not mapped, then a page fault will occur at t2. If the next word on the stack is also not mapped, then a page fault will occur on the subsequent instruction, t3. In both cases, the value of the virtual machine's EAX register is not stored in the hardware register "EAX" as is usually the case, but rather in the memory location "BT→tmpEAX". If a page fault occurs on either instruction, then the binary translator's synchronization subsystem 344 first determines that the instruction is indeed not at the start of a TC-synchronization block. Recall that the TC-synchronization map matches the beginning addresses for each source instruction and the beginning address of the corresponding translated basic block. The synchronization subsystem 344 can thus simply compare the address of the instruction that is current when the exception occurs with the list of beginning addresses, which can be searched using a standard binary search algorithm. The subsystem 344 then matches the particular sync-code of the translated basic block against a prestored list to determine if the block corresponds to either memory indirect call instructions, or to a broader class of instructions that can fault with "EAX" stored in the tmpEAX memory location. Based on the sync-code, the subsystem 344 can then dispatch to a type-specific subroutine that correctly assigns the value of the virtual machine's EAX register; such subroutines can be implemented using well-known programming techniques.

Synchronization on Asynchronous Exceptions

Consider again the previous example of the translation of "CALL [0x1776]". Suppose that a timer interrupt or disk interrupt occurs and generates a monitor action when the processor is about to execute instruction (t2) or (t3). In this case, the asynchronous event can be handled in a manner substantially similar to that of the page fault that can occur on that instruction, since no side-effects have yet been made to memory, and the state of the virtual registers has been preserved either in the physical registers or in memory for "EAX". Assume, however, that an asynchronous exception occurs at instructions (t4), (t5) or (t6). If this case, the technique used for faults cannot be applied, since instruction (t3) has a non-recoverable side-effect on the memory on the stack. Of course, the synchronization subsystem could augment the translated sequence with additional instructions to first save the previous content of the modified word on the top of the stack into a private memory location of the binary translator; however, this would limit the performance of the translated code in the most common case, in which no asynchronous exception occurs during the execution of the sequence.

Existing cross-architectural binary translators often require specific additional hardware in the form of store buffers coupled with commit/rollback instruction pairs (such as the Transmeta Crusoe). One advantage of this invention, however, is that it is able to precisely handle both major types of exceptions without specific hardware support, relying only on the instructions made available by commodity x86 processors (in those cases in which the invention is used in systems with an x86 architecture).

The invention also implements a technique that enables the handling of monitor actions (asynchronous exceptions) without affecting the common-case performance of the sequence. According to this technique, the translated sequence is allowed to complete its execution when such an event occurs, and the monitor action is processed at the next virtual machine instruction boundary. This approach is consistent with the semantic required of monitor actions, and more generally consistent with the instruction execution semantics of the virtual processor.

Two techniques can be used to allow the completion of the sequence. The first is to simply simulate the execution of the remaining instructions in the sequence. The second is to modify either the last instruction of the sequence, or the one immediately following the sequence, so that when this modified instruction is reached, then the monitor action subsystem is invoked when the sequence completes; on the x86 architecture, the memory location can, for example, be replaced with an "INT" instruction, which, upon execution, generates a trap that gives control back to the virtual machine monitor. The corresponding interrupt handler then restores the instruction sequence with its original content. At this point, the virtual machine is precisely at the next virtual machine instruction boundary, that is, the desired point to process all pending monitor actions.

The preferred embodiment of the invention uses the second technique, that is, a code patch, although both techniques are substantially similar, and share many of the same elements of complexity. Indeed, the complexity of the algorithms that determine where to patch the code is closely related to the complexity of the algorithms that generate the translated code. For example, certain translation sequences contains multiple jumps to other translation sequences, and so multiple locations must be patched with INT instructions. Some translation sequences, such as the one in the example above, also contain jumps to subroutines, and interrupts themselves may occur within the subroutines and must be handled accordingly.

The invention further uses the temporary patching technique (inserting interrupt instructions) to identify two types of locations that correspond to the different possible exit locations of any given translation sequence. These two location types are:

1) The different possible branch targets of the translated sequence that are within the translation cache and that themselves correspond to the start of another translation sequence. If the translated sequence is not terminated by a control-flow instruction, then first instruction of the following translation sequence is also considered a branch target. When the INT instruction is executed, the current virtual machine instruction pointer is derived from the TC-synchronization table of the location of the INT instruction.

2) All memory indirect jumps of the translation sequence that are used to emulate non-relative control flow changes (such as memory and register indirect jumps and return instructions). In this case, the INT instruction is not placed on the target of the memory indirect jump, since its location may not yet determined, but rather on the jump instruction itself. However, by the time the INT instruction itself traps, the target of the memory indirect jump is known—it can be determined either by simulating the original memory indirect jump, or by convention. That target address—which is also part of the TC—can then be used to determine the current virtual machine source instruction pointer by looking it up in the TC-synchronization table.

The differentiation between the two exit location types can be maintained in any number of ways. For example, it can be maintained by examining the contents of the original instruction that is overridden by the INT instruction, which the system stores in any case in order to be able to revert The use of memory indirect jumps is illustrated in the following code fragment, which performs a simple hash lookup in a table that keeps VM eip, and Translation Cache Address (TCA) mappings, to efficiently emulate a RETURN instruction:

| | |
|---|---|
| (t1) mov <gs>BT->tmpEBX, EBX | ;save EBX in temporary register tmpEBX in the binary translator |
| (t2) pop EBX; | ;put the value at the top of the instruction stack in register EBX (Note: this may fault) |
| (t3) mov <gs>BT->tmpEAX, EAX | ;save EAX in temporary register tmpEAX in the binary translator |
| (t4) lahf; | ;save CC flags in ah |
| (t5) mov <gs>BT->tmpFlags, EAX | ;save EAX |
| (t6) mov EAX, EBX; | ;copy EBX into EAX |
| (t7) and EBX, HASH_MASK | ;hash |
| (t8) add EBX, HASH_TABLE_ADDR | ;EBX points to hash record |
| (t9) cmp EAX, 0(EBX) | ;0(EBX) contains the hash table tag, to be compared against the EIP |
| (t10) bne failure | ;branch to failure |
| (t11) mov EBX, 4(EBX) | ;4(EBX) contains the location of the target location in the TCA |
| (t12) mov <gs>BT->memindTarget | ;save target |
| (t13) mov EBX, <gs>BT->tmpEBX | ;restore EBX |

| | |
|---|---|
| (t14) mov EAX, <gs>BT->tmpFlags; | ;store tmpFlags in EAX |
| (t15) sahf | ;restore CC flags |
| (t16) mov EAX, <gs>BT->tmpEAX | ;restore EAX |
| (t17) jmp <gs>BT->memindTarget | ;jump to next translation |
| failure: | |
| (t18) mov <gs>BT->eip, EAX | ;save VM eip |
| (t19) mov EBX, <gs>BT->tmpEBX | ;restore EBX |
| (t20) mov EAX, <gs>BT->tmpFlags; | ;store tmpFlags in EAX |
| (t21) sahf | ;restore CC flags |
| (t22) mov EAX, <gs>BT->tmpEAX | ;restore EAX |
| (t23) jump ChainingLoop | ;dispatch, use BT->eip |

The use of the memory indirect jump (t17) is required if the binary translator, by predetermined convention, maps all general-purpose virtual machine registers to the same hardware registers, effectively leaving no registers as scratch for the binary translator. (If the binary translator is provided with a free scratch register, then a register-indirect jump could be used in place of the memory indirect jump.)

In this example, an asynchronous exception that occurs anywhere within this sequence and generates a monitor action is handled by replacing (t17) with an INT instruction. Note that it is not required to also replace (t18) if the ChainingLoop is a support routine outside the translation cache that naturally processes pending monitor actions.

In general, the steps that the VMM follows in this case for handling asynchronous exceptions are thus:

1) The VMM finds the current sync-map entry as described above.

2) It then finds all branch target blocks, that is, possible addresses (instruction blocks) that it may ever have to branch when executing when executing a given target instruction stream in the TC.

3) The VMM then replaces the initial instructions for each potentially branched-to block with an interrupt instruction (INT).

4) The VMM resumes execution inside the TC.

5) Upon execution of any INT, it then restores all original instructions (the ones that got replaced by the INT), and processes the corresponding monitor actions.

6) If an instruction faults within step 4 and before step 5 even occurs, then all the replaced, original instructions are restored and the exception is forwarded to the virtual machine.

Note that steps 2)-4) need be carried out only if a monitor action is pending. Moreover, because of 5), the VMM will regain control at the next instruction boundary without affecting the "common-case" performance, and very few extra instruction cycles are caused. By replacing the beginning of the next TC element (translation of an original source instruction) with the interrupt instruction INT, the VMM allows the VM to finish execution of the current element before the VMM carries out the monitor actions; this avoids changing the VM state by the VMM before the VM has completed the element.

A possible alternative to steps 3)-6) would be to switch to interpretation, rather than to execute out of the TC. The interpreter would then execute one-by-one the instructions that are in the translation cache until the current instruction pointer (which is part of the translation cache) points to the start of the temporally following sync region. Yet another alternative to steps 3)-6) would be to rely on the hardware's single-stepping feature, which is present in processors such as the Intel x86, to perform the equivalent task of interpretation. After each single-step trap, the run-time system then again checks to determine if the exception instruction pointer is now part of a new sync region.

Translation Cache Subroutines

So far, the descriptions and examples have focused on code translations that correspond to a unique virtual machine instruction sequence. Unfortunately, this assumption would lead to a high degree of code expansion, with similar translation sequences being generated over and over again. In order to reduce the amount of generated code, the preferred embodiment of the invention uses translation cache subroutines that can be shared by different translation sequences. For example, in the code example above, 23 instructions are needed to translate a single instruction using a simple direct-mapped hash table. As RETURN instructions are very common in the translated source instruction stream (typically at least one per procedure), the use of subroutines substantially improves the performance of the binary translator according to the invention.

The code example shown above can thus be conveniently split as follows:

| | |
|---|---|
| (t1) mov <gs>BT->tmpEBX, EBX | ;save EBX |
| (t2) pop EBX; | ;(this may fault) |
| (t3) jmp ReturnSubroutine | ;go to ReturnSubroutine | where ReturnSubroutine contains (t3)-(t23) above.

Those skilled in the art of binary translation will recognize why the first two instructions (t1) and (t2) are left out of the subroutine and are allowed to remain in the translation sequence: (t2) can fault if the stack is not correctly mapped in the address space. As such, the synchronous exception mechanism according to the invention must be able to determine the virtual machine instruction pointer at the time of the fault. If the pop is within the translated sequence, then this can be inferred from the TC-synchronization map. If the pop is inside the subroutine, however, then it must be previously stored in a predefined location in memory, since the TC-synchronization map cannot map it back to a unique instruction pointer. This of course adds an additional instruction to be executed on every return, whether a fault should occur or not. The use of translation cache subroutines therefore requires the following refinements to the synchronous and asynchronous exception handling mechanisms described above:

1) A mechanism to differentiate the subroutines within the translation cache from the translated sequences, and associated a sync-codes identifying these subroutines.

2) If a synchronous exception occurs within a subroutine, then the sync-code specific handler must have a mechanism to determine the virtual machine instruction pointer. (The TC-synchronization entry mechanism, which looks up the source instruction pointer in the TC-sync table, cannot be used, because the translation in this case is shared.) Fortunately, in many cases, the binary translator can naturally separate the non-shared and shared portions of any translation in such a way that the shared part does not contain instructions that could trigger a synchronous exception.

3) If an asynchronous exception occurs within a subroutine, then all exit points must be replaced with interrupt instructions (INT) in a manner substantially similar to that of the translated sequences.

4) If an asynchronous exception occurs within a translated sequence which contains branches to one or more subroutines, then these branches themselves should not be patched (with INT instructions), since these points do not correspond to a virtual machine instruction boundary; rather, all exit points of the subroutines themselves that may be branched to by the translation sequence should be patched using INT instructions.

In general, the algorithms used to determine the location and meaning of the different branches in these translation cache sequences and subroutines can be implemented in any number of ways known in the art. For some sync-code types that always generate the same sequences, for example, using templates, the location of these branches may be known statically and the INT instructions can be efficiently inserted without having to read and decode the translation sequence.

Other, more complicated and more flexible code generation algorithms may not, however, be amenable to such techniques. In this case, a general mechanism is to decode the instruction sequence and reconstruct the control flow until a TC-synchronization entry boundary is encountered. All branches that point to other translations are then identified and temporarily replaced with INT instructions. All subroutines pointed to by identified branches are also analyzed using a substantially similar decoding and disassembly technique. Furthermore, all branches that point to callout routines are left unmodified for reasons that will become clear below.

Although complex, this general decoding of the instruction stream and reconstruction of the control flow is less complex than having to rely on the interpretation of the instruction sequence until the first TC-synchronization boundary is detected. This decoding approach is particularly advantageous compared with an interpreter on architectures such as the x86, where, due to the complexity of the instruction set, a complete interpreter is a very large piece of software. Nonetheless, as is mentioned above, software interpretation or hardware-based single-stepping are valid alternatives to the method preferred in this invention, namely, the use of INT instructions.

Translation Cache Callouts

The binary translation system according to the invention also handles exceptions that occur outside the translation cache, as well and transitions between the translation cache and the support routines (also known as callouts) in the context of asynchronous exceptions.

Recall the original system requirement that monitor actions be processed at the latest at the next virtual machine instruction boundary. If an interrupt occurs while the processor is executing a support routine, such as, for example, when it is translating a sequence of virtual machine instructions into the translation cache, then the system must guarantee that the monitor actions are processed before re-entering the translation cache. This can be done by ensuring that all return paths into the translator end with a critical region that checks for the presence of a monitor action. As is well-known in the art of systems programming, a critical region can be easily established by disabling all interrupts. On the x86 architecture, such a re-entering path can be implemented through a very small critical region as follows:

The critical region consists of the following steps, which reduce the length of the critical region and thus improves the responsiveness of the system as a whole to hardware interrupts.

Before entering the critical region, the target return location within the translation cache is first determined. This can be done in different ways, for example, by accessing the TC HASH 348. This lookup is, however, only "optimistic," because it can be invalidated by the processing of any monitor action.

The critical region starts by clearing all interrupts. On the x86 architecture, this is done using a "CLI" instruction. The system then checks if any monitor actions are pending. These would correspond to the monitor actions that have been queued during the processing of the callout. If any actions are pending, then interrupts are re-enabled, monitor actions are processed, and the target location is once again optimistically determined before entering the critical region for a subsequent attempt. If, however, there are no pending actions, then the system first restores the processor state to the one expected by the code that executes out of the translation cache; for example, it restores the registers and segment registers as appropriate. It then re-enables interrupts before returning inside the translation cache. On the x86 architecture, this can be done with a 2-instruction sequence:

| | |
|---|---|
| (i) STI | ;re-enable interrupts |
| (ii) <gs> jmp BT->targetTCA | ;resume execution at the memory location specified by TCA |

The semantic of the STI instruction on the x86 architecture conveniently re-enables interrupts only after the following instruction (in this case the jmp) has completed its execution. This guarantees that interrupts will not land before the hardware instruction pointer is within the translation cache. If an asynchronous exception occurs during the critical region, then it will be masked by the processor until the control returns to the location specified by BT→targetTCA. At this point, the mechanism that handles asynchronous exceptions from the translation cache described above will have been handled.

Since a critical region ends all paths that lead to a reentry into the translation cache, the TC-synchronization mechanism that handles asynchronous exceptions does not need to patch (with INT instructions) branches that call out of the translation cache and into portions of the run-time support code.

As is discussed at length above, two types of exceptions—synchronous and asynchronous—may arise when executing translated (target) instructions, which may be expanded relative to the corresponding original instructions, which may include conditional and unconditional branches. In all of the various permutations of these possibilities, the invention handles the exceptions either internally in the VMM, or the VMM forwards the exceptions to the respective virtual machine. The invention thus handles both types of exceptions and does this with no need for dedicated hardware support, with precise reentry into the instruction stream, and with minimal delay.

We claim:

1. A method comprising:

translating source instruction sequences of a source system into target instruction sequences;

initiating, by a target computing system, execution of the target instructions;

identifying a synchronous exception generated by the execution of the target instructions;

determining whether the synchronous exception is transparent or non-transparent, a transparent exception being an exception involving processing action within the target computing system, and a non-transparent exception being an exception involving processing that alters a visible state of the source system; and if the synchronous exception is transparent, handling the exception externally from the source system, the visible state of the source system thereby being unaffected by the handling of the synchronous exception; or if the sensed synchronous exception is non-transparent, forwarding the synchronous exception to the source system for processing.

2. The method of claim 1, wherein the synchronous exception is an exception resulting from attempted execution of the target instruction.

3. The method of claim 1, wherein translating source instruction sequences into target instruction sequences is by binary translation, and wherein a transparent exception does not alter the visible state of the source system.

4. A non-transitory computer readable medium comprising computer executable instructions that, when executed by at least one processor, cause the at least one processor to:

translate source instruction sequences of a source system into target instruction sequences;

initiate, by a target computing system, execution of the target instructions;

identify a synchronous exception generated by the execution of the target instructions;

determine whether the synchronous exception is transparent or non-transparent, a transparent exception being an exception involving processing action within the target computing system, and a non-transparent exception being an exception involving processing that alters a visible state of the source system; and if the synchronous exception is transparent, handle the exception externally from the source system, the visible state of the source system thereby being unaffected by the handling of the synchronous exception; or if the sensed synchronous exception is non-transparent, forwarding the synchronous exception to the source system for processing.

5. A method for handling exceptions comprising the following steps:

translating source instruction sequences of a source system into target instruction sequences;

executing the target instructions;

sensing the presence of an exception;

determining whether the sensed exception is synchronous resulting from attempted execution of a target instruction or asynchronous resulting from an event unrelated to the execution of a target instruction;

if the sensed exception is asynchronous, delaying application of the sensed exception until after the completion of the target instruction sequence corresponding to the current source instruction when the asynchronous exception is sensed; or if the sensed exception is synchronous, determining whether the sensed synchronous exception is transparent or non-transparent; and if the sensed synchronous exception is transparent, handling the exception externally from the source system, the visible state of the source system thereby being unaffected by the handling of the exception; or if the sensed synchronous exception is non-transparent, forwarding the exception to the source system for processing.

6. A method comprising:

translating source instruction sequences into target instruction sequences;

initiating execution of the target instructions;

identifying an asynchronous exception during the execution of the target instructions; and upon identifying the asynchronous exception during the execution of the target instructions, executing a first execution sequence or a second execution sequence;

wherein the first execution sequence comprises:

temporarily replacing initial target instructions with a trap generation instruction in each of the translated target instruction sequences that correspond to target instruction sequences that immediately follow a current target instruction sequence, before handling the asynchronous exception, executing the current target instructions sequence from a point at which the asynchronous exception was identified, restoring each of the temporarily replaced instructions with their original content after processing the asynchronous exception, and upon reaching the trap generation instruction, forwarding and processing the asynchronous exception, and wherein the second execution sequence comprises:

temporarily replacing each indirect branch instruction with the trap generation instruction, each indirect branch instruction corresponding to a last instruction of the current target instruction sequence, resuming execution of the current target instruction sequence from a point at which the asynchronous exception was processed, restoring each of the temporarily replaced instructions with their original content, and simulating each of the restored indirect branch instruction.

7. The method of claim 6, wherein translating source instruction sequences into target instruction sequences is by binary translation.

8. The method of claim 6, further comprising upon identifying an asynchronous exception during the execution of the target instructions:

determining a source instruction pointer as a predetermined function of a final target instruction pointer;

forwarding and processing the asynchronous exception; and resuming execution at a location in a translation cache that corresponds to a current source instruction pointer, the asynchronous exception being processed only upon completion of execution of the translated target instructions corresponding to whole source instructions.

9. The method of claim 8, further comprising simulating execution of remaining target instructions.

10. The method of claim 8, further comprising single-stepping an execution of remaining target instructions.

11. The method of claim 6, further comprising, prior to the executing of the target instruction sequence, modifying one of the following instructions such the target instruction sequence is executed to completion when this modified instruction is reached: a last instruction of the target instruction sequence, and an instruction immediately following the target instruction sequence.

12. A system comprising:

a hardware target computer system that has a target instruction set architecture (ISA) and executes target instruction sequences;

a source system that has a source ISA and source instruction sequences;

a binary translator, the binary translator converting source instruction sequences into target instruction sequences by binary translation, each target instruction sequence of one or more target instructions corresponding to a source instruction sequence of one or more source instructions;

an intermediate software layer, the intermediate software layer responding to exceptions in the computer system; and a processor programmed to:
sense the presence of an exception;
determine whether the sensed exception is synchronous resulting from attempted execution of a target instruction or asynchronous resulting from an event unrelated to the execution of a target instruction;
if the sensed exception is asynchronous, delay application of the sensed exception until after the completion of the target instruction sequence corresponding to the current source instruction when the asynchronous exception is sensed; or
if the sensed exception is synchronous, determine whether the sensed synchronous exception is transparent or non-transparent; and
if the sensed synchronous exception is transparent, handle the exception externally from the source system, the visible state of the source system thereby being unaffected by the handling of the exception; or
if the sensed synchronous exception is non-transparent, forward the exception to the source system for processing.

13. The system of claim 12, wherein the source system is a virtual machine, wherein the intermediate software layer comprises a virtual machine monitor that is operationally installed between the virtual machine and the hardware target computer system, and wherein virtual machine monitor includes the binary translator.

14. A non-transitory computer readable medium comprising computer executable instructions that, when executed by at least one processor, cause the at least one processor to:
translate source instruction sequences into target instruction sequences;
initiate, by a target computing system, execution of the target instructions;
identify an asynchronous exception during the execution of the target instructions, the asynchronous being an exception resulting from an event unrelated to the execution of the target instruction; and
upon identifying the asynchronous exception during the execution of the target instructions, execute a first execution sequence or a second execution sequence;
wherein the first execution sequence comprises:
temporarily replacing initial target instructions with a trap generation instruction in each of the translated target instruction sequences that correspond to target instruction sequences that immediately follow a current target instruction sequence,
before handling the asynchronous exception, executing the current target instruction sequence from a point at which the asynchronous exception was identified,
restoring each of the temporarily replaced instructions with their original content after processing the asynchronous exception, and
upon reaching the trap generation instruction, forwarding and processing the asynchronous exception, and
wherein the second execution sequence comprises:
temporarily replacing each indirect branch instruction with a trap generation instruction, each indirect branch instruction corresponding to a last instruction of a current target instruction sequence,
resuming execution of the current target instruction sequence from a point at which the asynchronous exception was processed,
restoring each of the temporarily replaced instructions with their original content, and
simulating each of the restored indirect branch instruction.

15. The non-transitory computer readable medium of claim 14, wherein the computer executable instructions further cause the at least one processor to, upon identifying an asynchronous exception during the execution of the target instructions:
determine a source instruction pointer as a predetermined function of a final target instruction pointer;
forward and process the asynchronous exception; and
resume execution at a location in a translation cache that corresponds to a current source instruction pointer, the asynchronous exception being processed only upon completion of execution of the translated target instructions corresponding to whole source instructions.

16. The non-transitory computer readable medium of claim 14, wherein the computer executable instructions further cause the at least one processor to perform one of the following: previously presented simulate execution of remaining target instructions or previously presented singe-step an execution of remaining target instructions.

* * * * *